United States Patent [19]

Pipon et al.

[11] Patent Number: 4,787,593
[45] Date of Patent: Nov. 29, 1988

[54] DEVICE FOR ADJUSTING THE TRIM OF A VEHICLE SEAT

[75] Inventors: Yves Pipon; Georges Droulon, both of Flers, France

[73] Assignee: A & MN Cousin & Cie, Flers, France

[21] Appl. No.: 837,190

[22] Filed: Mar. 7, 1986

[30] Foreign Application Priority Data

Mar. 7, 1985 [FR] France ............................. 85 03383

[51] Int. Cl.⁴ ........................................... A47D 19/04
[52] U.S. Cl. .................................. 248/396; 248/422; 297/325; 297/348
[58] Field of Search .................... 248/396, 371, 372.1, 248/394, 398, 421, 422; 297/313, 325, 330, 345, 346, 347, 348

[56] References Cited

U.S. PATENT DOCUMENTS

| 3,335,995 | 8/1967 | Pickles | 248/394 |
| 4,387,874 | 6/1983 | Boisset | 348/396 |
| 4,470,318 | 9/1984 | Cremer et al. | 248/396 X |
| 4,487,390 | 12/1984 | Miyashita | 248/396 |
| 4,488,699 | 12/1984 | Chevalier | 248/396 |
| 4,556,185 | 12/1985 | Takagi | 248/421 |
| 4,629,151 | 12/1986 | Nishino | 248/396 |

FOREIGN PATENT DOCUMENTS 2723550 12/1978 Fed. Rep. of Germany ...... 248/396

Primary Examiner—Alvin C. Chin-Shue
Assistant Examiner—David L. Talbott
Attorney, Agent, or Firm—Browdy and Neimark

[57] ABSTRACT

The device enables a trim adjustment of the vehicle seat. An upper side of each upper section of a slide member carries two square members having vertical wings. The vertical wings maintain, at their upper ends either frontwardly or rearwardly of the seat, spindles on which is articulated a shoe-square. One of the two square members carries an articulation iron fitting enabling, by means of a reduction lever rotating with the mobile flange of each articulation, to raise a rear or front shoe-square in order that a seat frame fixed on the shoe-squares is displaceable by a clearance angle delimited according to needs either for a rear part of the seat or for a front part of the seat between a lower dead point and an upper dead point.

8 Claims, 4 Drawing Sheets

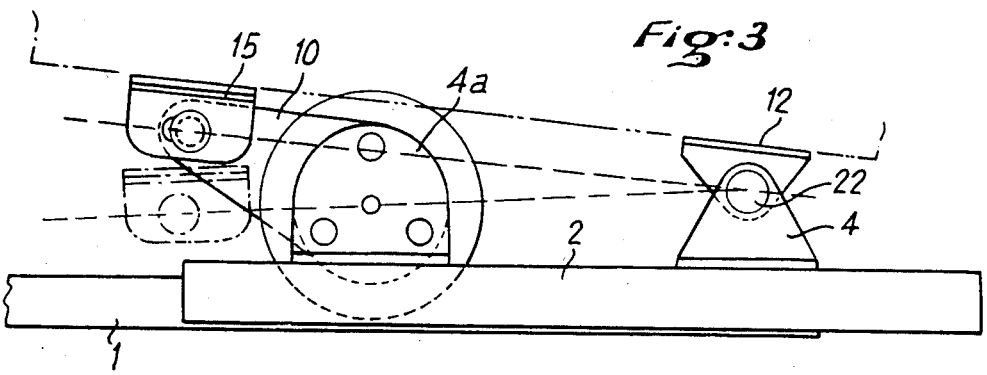
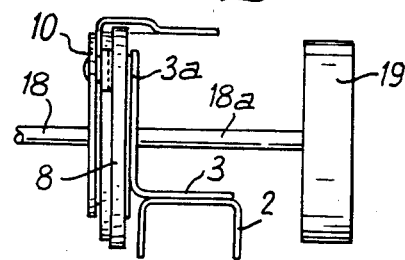
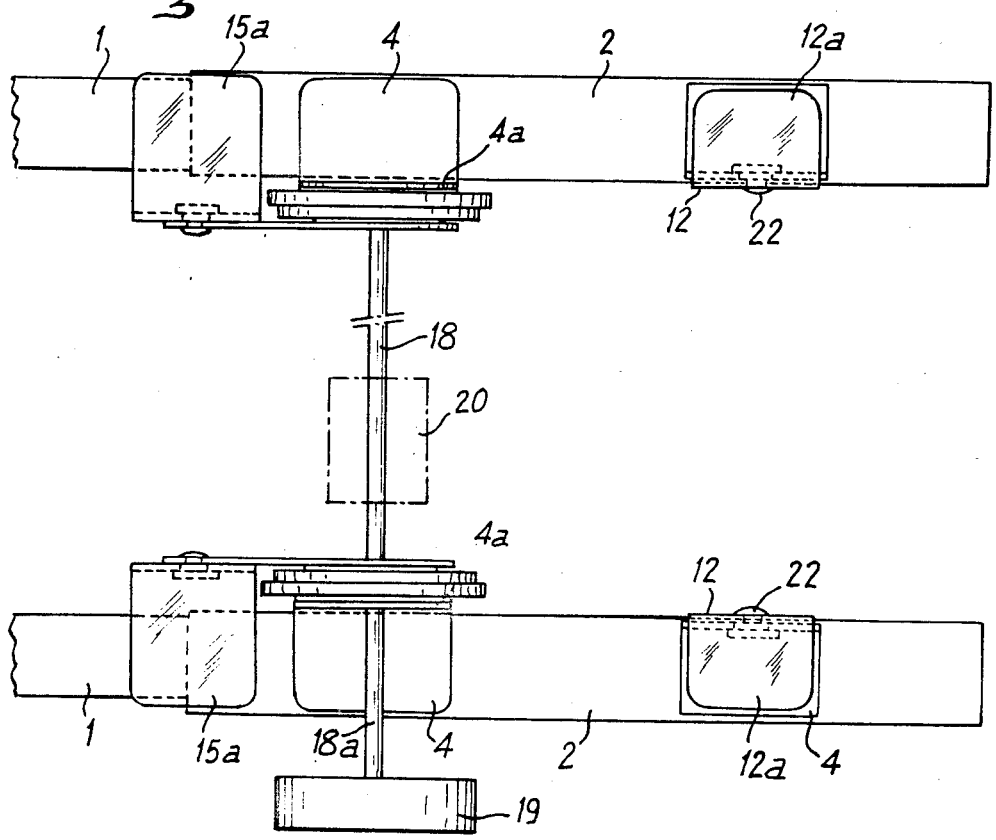

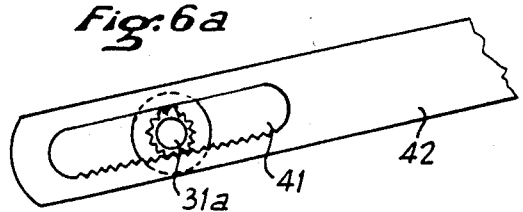
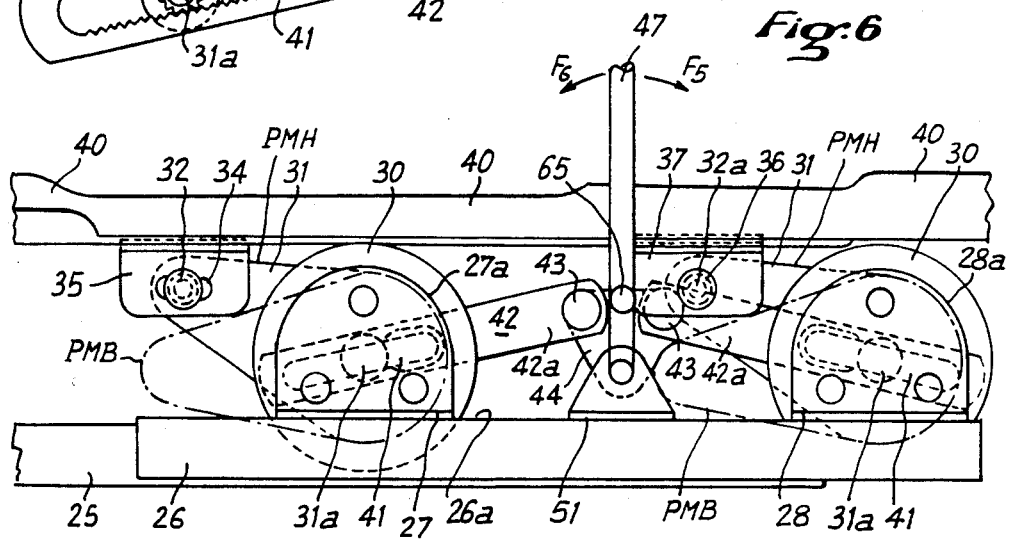
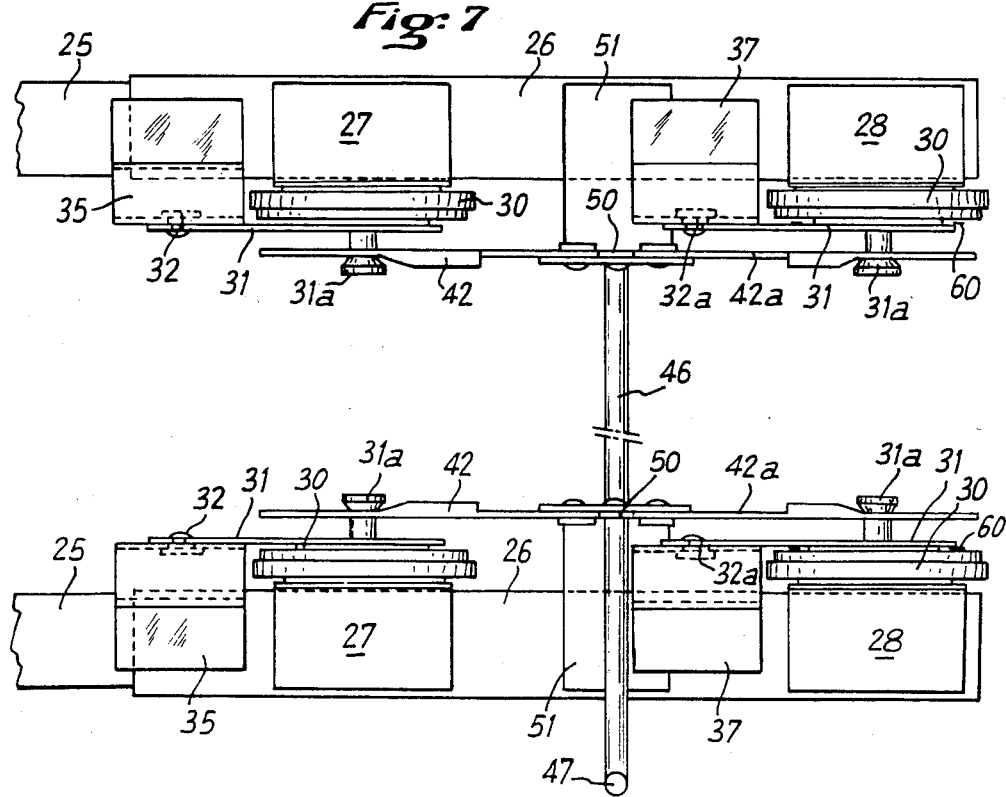

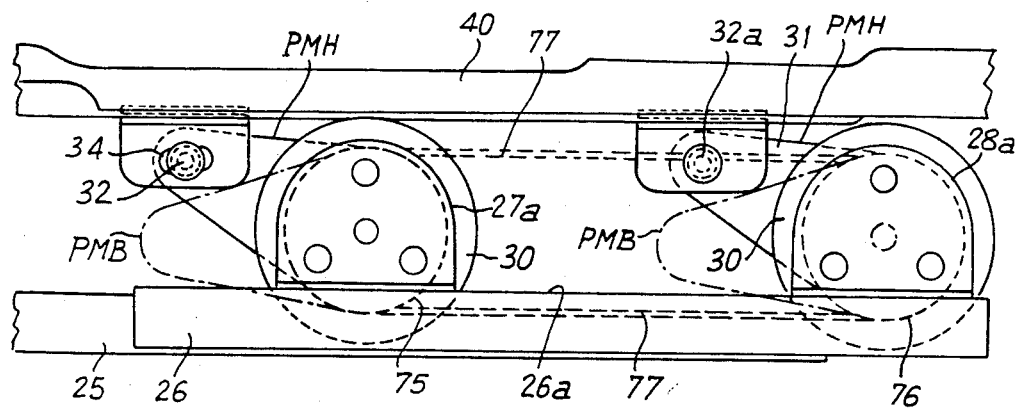
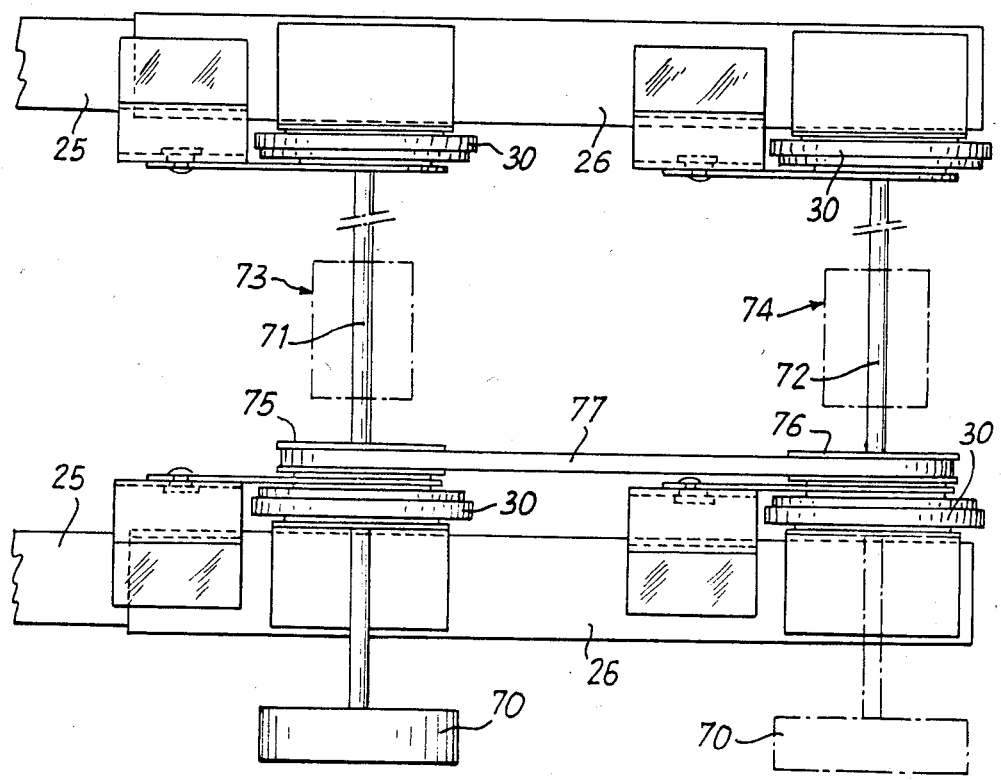

DEVICE FOR ADJUSTING THE TRIM OF A VEHICLE SEAT

BACKGROUND OF THE INVENTION

The present invention relates to a device enabling to adjust the trim of a seat frame of a seat used in ground, sea and air vehicles, in order to improve comfort and therefrom to reinforce safety above all with respect to the driver's seat.

BRIEF DESCRIPTION OF KNOWN PRIOR ART

Various devices are already known for enabling to adjust the trim of a vehicle seat, i.e. the height of the seat frame of a seat, by adjusting the height either of the rear part of the seat, or of the front part of the seat, and even simultaneously of the front part and the rear part of the seat. However, the known devices are relatively complicated, cumbersome and heavy. Besides, the known devices necessitate an adjustment which is difficult, particularly for an inexperienced person; they are therefore used in an irrational manner.

Moreover, and because of the small inner volume of a vehicle and because of the heavy technical characteristics imposed by legal regulations, it has been necessary to think entirely over this problem to give thereto a solution which will be as simple as possible by designing a device which is not cumbersome, which is very easy to adjust by the user and which has a very great resistance. Actually, these devices in connection with the longitudinal adjusting slide members must support, in case of shocks, very great efforts enabling an absorption of power and limiting therefrom injuries to the passengers or to the driver who is maintained on its seat by a safety belt rigidly connected to these means.

OBJECT OF THE INVENTION

The present invention remedies these drawbacks by providing an adjusting device of the trim of a seat frame, this adjusting device being simple, having a small bulk being easy to adjust and having a very great resistance for absorbing a lot of energy in case of shocks, but providing also a stable suspension without play which thus increases the passenger's comfort.

SUMMARY OF THE INVENTION

According to the invention, in a device enabling a trim adjustment of a vehicle seat, an upper side of each upper section of a slide member carries two square members having vertical wings, these vertical wings maintaining at their upper ends, either frontwardly or rearwardly of the seat, a spindle on which is articulated a shoe-square. The rear or front square member carries an articulation iron fitting enabling, by means of a reducing lever rotating with the mobile flange of each articulation, to raise a rear or front shoe-square in order that a seat frame fixed on the shoe-squares is displaceable by a clearance angle delimited according to needs either for a rear part of the seat or for a front part of the seat between a lower dead point and an upper dead point.

According to another feature of the invention, the articulations are of the epicyclic gear type or of the wedging type by means of bearing plates.

Various other features of the invention will moreover be revealed from the following detailed description.

BRIEF DESCRIPTION OF THE DRAWINGS

Embodiments of the invention are shown by way of non-limiting examples in the accompany drawings, wherein:

FIG. 3 shows an elevation view of a device similar to that of FIG. 1 but provided to adjustment of the front part of the seat;

FIG. 4 is a partial front elevation view of the right part of the device of FIG. 3, FIG. 5 is a plane view corresponding to FIG. 3;

FIG. 6 is a side elevation view of a device enabling a manual elevation of a trim of the seat by raising the front and rear parts of the seat;

FIG. 6a is an enlarged view of a part of FIG. 6;

FIG. 7 is a plane view corresponding to FIG. 6;

FIG. 8 shows another embodiment of the front and rear adjusting device of the seat frame of the seat, the adjustment being made manually either for the rear part or front part or simultaneously for the rear and front parts with a motor telecontrol possibility;

FIG. 9 is a plane view corresponding to FIG. 8.

DESCRIPTION OF PREFERRED EMBODIMENTS

Figure 1:
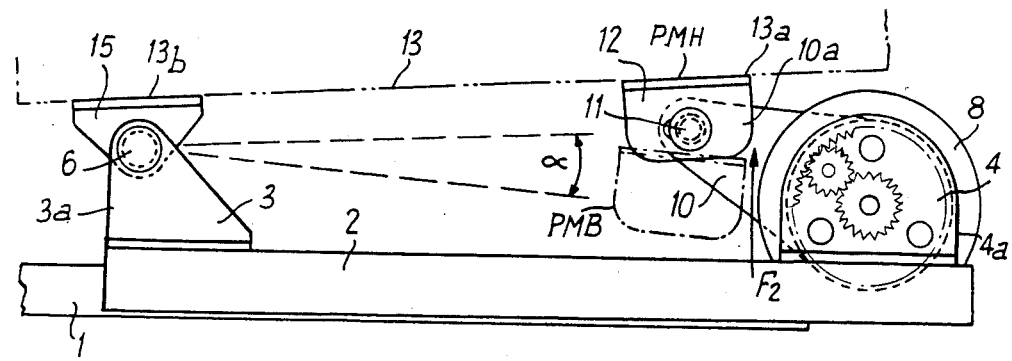
FIG. 1 is a side-elevation view of the device enabling to adjust the trim of a seat frame of a seat by its rear part.

In FIG. 1, there is partly shown the lower section 1 and the upper section 2 of a slide member enabling a longitudinal front and rear adjustment of the position of a seat.

Figure 2:
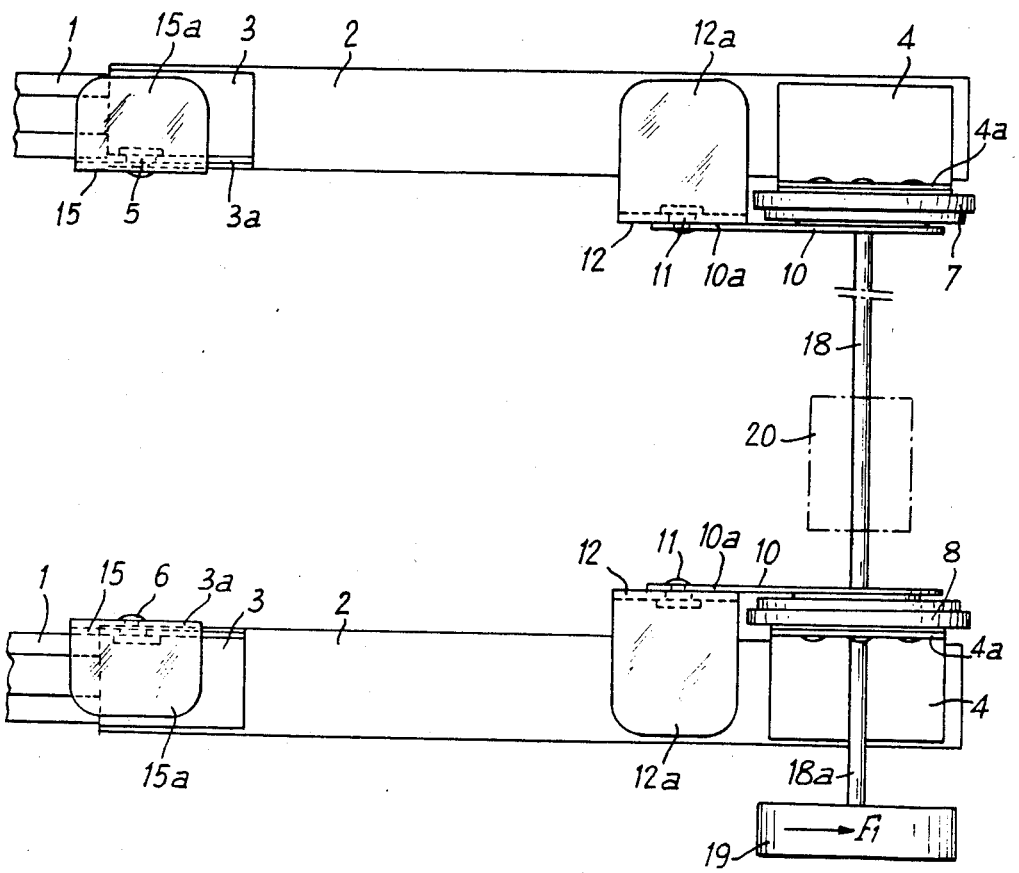
FIG. 2 is a plane view corresponding to FIG. 1.

There obviously exists, as shown in FIG. 2, two parallel slide members placed under the right and left parts of each seat.

The upper side of the upper section 2 is provided with square members 3, 4 mounted at particular places according to the type of seat, the square members 3, 4 having vertical wings 3a, 4a used as supports. The wings 3a carry spindles 5, 6, and the wings 4a carry articulation iron fittings 7, 8 which can be bearing plate articulations, discontinuous articulations or continuous articulations based upon either locking devices by wedging or epicyclic gears (the parts of which are indicated with dotted lines in FIG. 1, namely a central gear a rotating with shaft 18, an intermediate bear b fixed on the reduction lever 10, the teeth of which engage teeth on an opposing part of articulation 8), or by any other corresponding device which can be placed innerly of a ring having a very small thickness.

In one embodiment, micrometric irreversible epicyclic articulations are used, these articulations enabling therefore an important choice in positions between an upper dead point and a lower dead point, the lower dead point being shown in phantom in FIG. 1 (PMB) and the upper dead point being in full line (PMH).

The mobile flange of each articulation 7, 8 is rigidly connected to a reduction lever 10 having a substantially triangular shape and the end 10a of which carries a spindle 11 on which is mounted a shoe-square 12, the upper side 12a of which carries the rear part 13a of the frame 13 of a seat.

The front shoe-squares 15 mounted on the spindles 5, 6 have also an upper side 15a which is substantially horizontal and which carries the front part 13b of the seat frame 13 of the seat.

Generally, and in the case of FIGS. 1 and 2, the articulations 7 and 8 are connected together by connecting members 18 such as a shaft normally driven by a handling knob 19 at its end 18a placed at the rear outer end of the seat.

Thus, by rotating the knob 19 in the direction of the arrow $F_1$ (FIG. 2), the articulations 7, 8 are rotatively driven, which makes the reduction levers 10 to upwardly pivot (i.e. in direction of the arrow $F_2$, FIG. 1), which raises the rear shoe-square 12 upwardly. Going from the position PMB (FIG. 1) to the position PMH (FIG. 1) causes the rear part of the seat to be raised by a clearance angle $\alpha$ which, according to needs, may vary according to the type of seat and to the type of vehicle to be fitted with the device.

Obviously, the rotation of the reduction levers 10 causes a rotation of the front shoe-square 15 on the spindles 5, 6.

It is also possible, as shown in FIG. 2, to drive the articulation of the connection shaft 18 by means of a motor unit 20 which is more often an electric motor, the working of which is controlled by an electronic circuit from the dash board of the vehicle either by a fraction of angle $\alpha$ at each time or in a continuous manner between the lower point and the upper point, at will of the user.

Thus, the device of FIGS. 1 and 2 enable a continuous adjustment from a lower dead point up to an upper dead point, and, respectively, from an upper dead point to a lower dead point. The rear part of the seat frame of the seat is therefore in the position chosen by the user.

In FIGS. 3–5, the device is similar to that of FIG. 1, but it is the front part of the seat which is raised by the reduction levers 10 which carry the front shoe-squares 15, while the rear shoe-squares 12 are merely mounted on spindles 22 rigidly connected to square-members 4.

As in the preceding case, it is also possible to have a manual control with the control knob 19 or a motor unit 20 which is mounted on the shaft 18, and which is generally made by an electric motor controlled as above explained.

In FIG. 6, there is shown, on the one hand partially, the lower section 25 and, on the other hand entirely, the upper section 26 of a slide member enabling the longitudinal adjustment of the seat.

The upper side 26a of the section 26 carries two square members 27, 28 having vertical wings 27a, 28a each maintaining as above described an articulation 30 the mobile flange of which is rigidly connected to reduction levers 31 which are each provided at their ends with a spindle 32, 32a.

The spindles 32 are housed in button-holes 34 of the front shoe-squares 35, while the spindles 32a are housed in holes 36 of the rear shoe-squares 37. The shoe-squares 35, 37 carry the lower part 40 of the seat frame.

In FIG. 6, the reduction levers 31 (shown with solid lines) are at the position of the upper dead point PMH, and the position of the reduction levers 31 have been shown in phantom at the lower dead point PMB.

The clearance angle delimited according to needs is therefore easily shown.

In the present case, the articulations 30 are generally of the bearing plate type in order that the rotation of their center shaft 31a causes a rotation of a control means enabling to lock and unlock, according to the rotation direction, one or a plurality of bearing plates in order to rigidly connect the fixed and mobile flanges of the articulation. The articulations are provided so that the fixed flange is maintained on the wing 28a by means of square member 28 while the mobile flange is rigidly connected to the reduction lever 31.

The rotation angle for each shaft 31a is obtained by means of toothed recesses 41 made in the arms 42 engaged with toothed parts made on the periphery of each shaft 31a in order to obtain a compulsory drive (FIG. 6a). Each shaft 31a is, as shown in the drawings, housed in a toothed recess 41.

The ends 42a of the arms 42 are mounted on spindles 43 rigidly connected to a triangular part 44 itself rigidly connected to a control shaft 46 having a vertical handling lever 47. The shaft 46 is supported in smooth bearings made in the vertical wings 50 of the square members 51 rigidly connected to the center part of the top of the upper section 26 of the slide member 25.

If the control lever 47 is pivoted in the direction of the arrow $F_5$ (FIG. 6), the rear articulations 30 are unlocked and then the two arms 42 are moved causing a rotation of each center shaft 31a so that the mobile flange of each articulation 30 is freed, and therefore each rear reduction lever can move in the direction chosen by the seat user who can thus, by a rear push on the seat, make the seat go down when he finds that the rear of the seat frame of this seat is too high or conversely to raise the rear of the seat frame with help of a spring (not shown) having a fixed point on the fixed part of each articulation 30 and a free mobile point on each reduction lever 31.

When the control level 47 is pivoted in direction of the arrow $F_6$ (FIG. 6), working is identical since pivoting of the control lever 47 has permitted:

(a) bringing the arm 42 from rear to front and, therefore, locking the articulations 30 in the chosen position for the rear of the seat frame of the seat, and (b) unlocking the front articulations 30 by thus freeing the reduction levers 31 enabling to raise or to lower the front part of the seat frame of the seat between the positions PMH and PMB, or PMB and PMH.

Owing to the disposition of the adjusting means and pivotment of the reduction levers 31, the front spindles 32 are correctly moved in the holes 34 while providing, on the one hand, a possibility of adjustment of the trim of the seat frame of the seat and, on the other hand, a taking-up of a play able to occur.

By bringing the control lever 47 back in its vertical position, locking of the front articulations 30 is ensured, as well as a complete locking of the device enabling a vertical adjustment of the trim of the seat frame of the seat.

For safety measure and to obviate an untimely move of the lever 47 causing a front or rear unadjustment of the seat, the control lever 47 is in its vertical median position by means of a complementary locking device 65.

In FIGS. 8–9, there is shown a device enabling an adjustment of the trim of a vehicle seat which comprises the same members as the device according to the embodiment of FIG. 6. However, in FIG. 8, the articulations 30 are controlled two by two (front articulations and rear articulations) either by means of a handling member 70 mounted in the extension of the shafts 71, 72 connecting, two by two, the front and rear articulations 30 or by means of motor units 73, 74 submitted to a working telecontrol placed on the dashboard of the vehicle, or yet by fixing, on the shafts 71, 72, pulleys 75, 76 connected by an endless belt 77 for obtaining, by means of a single motor unit or by means of a member 70, a simultaneous drive of the articulations 30. In one embodiment, the articulations are of an epicyclic type in order that the front and rear rotations of the above articulations will enable an adjustment in height of the trim of the seat frame of the seat, as this has being explained hereinabove in detail. In case the motor units 73, 74 acting on the adjustment in height of the seat frame of the seat are controlled by an electronic telecontrol, this control can comprise a memory for rapidly obtaining the position of the seat frame according to the user.

As a subsequent remark, and in case of the front and rear adjustments shown in FIGS. 6-9, the button holes 34 can be placed either on the front or on the rear of the raising devices according to the type of vehicle and of seat which is used.

What is claimed is:

1. A device enabling a trim adjustment of a vehicle seat, comprising
   a slide member having an upper section for each of two respective sides of said seat, for moving said seat forward and backward,
   two square members fixed at opposite upper end portions of each said upper section, each said square member having a vertical wing,
   a respective shoe-square operatively connected to said vehicle seat and a respective spindle for supporting each said shoe-square, each said shoe-square and spindle being associated with a respective one of said vertical wings,
   wherein at least one of the two square members on each said upper section of each said slide member carries an articulation fitting for providing rotation about a respective colinear axis of each pair of the articulation fittings at the same ends of said upper sections, each said articulation fitting including a fixed flange supported on the respective vertical wing and a mobile flange connected with a reduction lever, each said mobile flange and the respective reduction lever rotating about the axis of the respective articulation fitting for enabling, by means of each respective reduction lever rotating with the respective mobile flange of each articulation fitting about the axis of the respective articulation fitting, a raising of the respective shoe-square, in order that a frame of said seat fixed on the shoe-squares is selectively displaceable, at least for a rear part of the seat or for a front part of the seat, between respective lower and upper dead points PMB and PMH, each said reduction lever being connected at an end thereof by the respective spindle to the respective shoe-square.

2. The device as set forth in claim 1, wherein each said articulation fitting is of a epicyclic gear type.

3. The device as set forth in claim 1, wherein control of each pair of said articulation fittings on the same respective ends of said upper sections is provided by means of a respective connecting shaft extending therebetween colinearly with said colinear axes of rotation of the respective pair of articulation fittings, each said connecting shaft having an extension with a control knob.

4. The device as set forth in claim 3, wherein each said connecting shaft is driven by an electric motor which is supplied with power by means of an electronic circuit controlled from the dash-board of the vehicle.

5. The device as set forth in claim 1, comprising
   a pair of said articulation fittings at both ends of said upper sections, and
   a pair of shafts, each connecting between the respective pair of articulation fittings, each said shaft extending colinearly with the axes of rotation of the respective pair of articulation fittings,
   wherein said rotating of each said pair of articulation fittings is obtained by means of a respective electric motor mounted on the respective shaft for each of said pair of articulation fittings, each said motor being controlled by an electronic circuit.

6. Device as set forth in claim 5, wherein the electronic circuit comprises a memory.

7. The device as set forth in claim 1, wherein four of said articulation fittings are provided at said opposing ends portions of said upper sections, for controlling the raising and lowering of the seat frame of the seat, by manual handling means provided therewith, said device comprising two-pulleys mounted respectively on a pair of shafts, each said shaft transversely connecting a respective pair of the articulation fittings and being colinear with the axes of rotation of the articulation fittings, the pulleys being connected by an endless belt.

8. The device as set forth in claim 1, having only two of said articulation pitting, at the same respective end portion of each of said two upper sections, wherein the respective spindles connect between said vertical wings on said opposing end portions of said upper sections and the respective shoe-squares.

* * * * *